United States Patent
McHugh

(10) Patent No.: US 7,465,336 B2
(45) Date of Patent: *Dec. 16, 2008

(54) FUEL DEOXYGENATION SYSTEM WITH NON-PLANAR PLATE MEMBERS

(75) Inventor: David E. McHugh, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 533 days.

This patent is subject to a terminal disclaimer.

(21) Appl. No.: 11/148,508

(22) Filed: Jun. 9, 2005

(65) Prior Publication Data

US 2006/0278073 A1 Dec. 14, 2006

(51) Int. Cl.
*B01D 53/22* (2006.01)

(52) U.S. Cl. .................. 95/46; 95/54; 95/263; 96/6; 96/7; 96/11; 55/524

(58) Field of Classification Search .............. 96/4, 96/6, 7, 11; 95/45, 46, 54, 263; 55/524, 55/DIG. 5

See application file for complete search history.

(56) References Cited

U.S. PATENT DOCUMENTS

| | | | |
|---|---|---|---|
| 4,220,535 A * | 9/1980 | Leonard | ............ 96/6 |
| 4,371,385 A | 2/1983 | Johnson | |
| 4,516,984 A | 5/1985 | Warner et al. | |
| 4,602,923 A | 7/1986 | Bernstein | |
| 4,729,773 A | 3/1988 | Shirato et al. | |
| 4,955,992 A | 9/1990 | Goodale et al. | |
| 5,053,060 A | 10/1991 | Kopf-Sill et al. | |
| 5,078,755 A | 1/1992 | Tozawa et al. | |
| 5,123,937 A | 6/1992 | Shibata et al. | |
| 5,154,832 A | 10/1992 | Yamamura et al. | |
| 5,340,384 A | 8/1994 | Sims | |
| 5,410,052 A | 4/1995 | Smith et al. | |
| 5,482,860 A | 1/1996 | Copeland et al. | |
| 5,522,917 A | 6/1996 | Honda et al. | |
| 5,693,122 A | 12/1997 | Berndt | |
| 5,695,545 A | 12/1997 | Cho et al. | |
| 5,830,261 A * | 11/1998 | Hamasaki et al. | ........ 96/6 |
| 5,888,275 A | 3/1999 | Hamasaki et al. | |

(Continued)

FOREIGN PATENT DOCUMENTS

EP 0273267 7/1988

(Continued)

OTHER PUBLICATIONS

U.S. Appl. No. 11/334,126, entitled "A Method for Enhancing Mass Transport in Fuel Deoxygenation Systems", filed Jan. 18, 2006.

(Continued)

*Primary Examiner*—Jason M Greene
(74) *Attorney, Agent, or Firm*—Carlson, Gaskey & Olds PC

(57) ABSTRACT

A fuel system for an energy conversion device includes a multiple of fuel plates, oxygen permeable membranes, porous substrate plates, and vacuum frame plates which define a wave pattern configuration. The wave configuration enhances deoxygenation by increasing the efficiency and integrality due to higher surface volume ration, increase of flow turbulence, and minimal sharp edges which may otherwise damage the oxygen permeable membranes compared to other configurations.

10 Claims, 3 Drawing Sheets

U.S. PATENT DOCUMENTS

| | | | |
|---|---|---|---|
| 5,902,382 A | 5/1999 | Campain et al. | |
| 5,902,747 A | 5/1999 | Nemser et al. | |
| 6,106,591 A | 8/2000 | Keskar et al. | |
| 6,168,648 B1 | 1/2001 | Ootani et al. | |
| 6,258,154 B1 | 7/2001 | Berndt et al. | |
| 6,309,444 B1 | 10/2001 | Sims et al. | |
| 6,315,815 B1 * | 11/2001 | Spadaccini et al. | 95/46 |
| 6,379,796 B1 | 4/2002 | Uenishi et al. | |
| 6,402,810 B1 | 6/2002 | Mayer et al. | |
| 6,402,818 B1 | 6/2002 | Sengupta | |
| 6,494,938 B2 | 12/2002 | Sims et al. | |
| 6,514,412 B1 * | 2/2003 | Insley et al. | 210/644 |
| 6,616,841 B2 | 9/2003 | Cho et al. | |
| 6,623,637 B1 | 9/2003 | Monzen et al. | |
| 6,682,016 B1 | 1/2004 | Peroulakis | |
| 6,709,492 B1 * | 3/2004 | Spadaccini et al. | 96/6 |
| 7,014,681 B2 * | 3/2006 | Noack et al. | 95/54 |
| 7,153,343 B2 * | 12/2006 | Burlatsky et al. | 95/46 |
| 7,255,721 B1 * | 8/2007 | Sato et al. | 96/11 |
| 2001/0035093 A1 | 11/2001 | Yokota | |
| 2002/0195385 A1 | 12/2002 | Cho et al. | |
| 2003/0116015 A1 | 6/2003 | Sengupta et al. | |
| 2003/0148164 A1 | 8/2003 | Koch et al. | |
| 2003/0151156 A1 | 8/2003 | Crumm et al. | |
| 2003/0161785 A1 | 8/2003 | Dieckmann | |
| 2003/0219637 A1 | 11/2003 | Coors | |
| 2004/0025696 A1 | 2/2004 | Varrin, Jr. et al. | |
| 2004/0028988 A1 | 2/2004 | Bunker | |
| 2004/0050786 A1 | 3/2004 | Dey et al. | |
| 2004/0094463 A1 | 5/2004 | Laverdiere et al. | |

FOREIGN PATENT DOCUMENTS

| | | |
|---|---|---|
| EP | 0354797 | 2/1990 |
| EP | 0 392 010 A1 * | 10/1990 |
| EP | 0460512 | 12/1991 |
| EP | 0493869 | 7/1992 |
| EP | 0552090 | 7/1993 |
| EP | 0576677 | 1/1994 |
| EP | 0583748 | 2/1994 |
| EP | 0622475 | 11/1994 |
| EP | 0750322 | 12/1996 |
| EP | 0963229 | 8/1998 |
| EP | 09070738 | 1/2000 |
| EP | 1018353 | 7/2000 |
| EP | 1052011 | 11/2000 |
| EP | 1210971 | 6/2002 |
| EP | 1239189 | 9/2002 |
| EP | 1270063 | 1/2003 |
| EP | 1277504 | 1/2003 |
| JP | 63151307 | 6/1988 |
| JP | 3169304 | 7/1991 |
| JP | 3193106 | 8/1991 |
| JP | 5084474 | 4/1993 |
| JP | 5317605 | 12/1993 |
| JP | 7080205 | 3/1995 |
| JP | 7227504 | 8/1995 |
| JP | 8000906 | 1/1996 |
| JP | 8332306 | 12/1996 |
| JP | 10174803 | 6/1998 |
| JP | 10216404 | 8/1998 |
| JP | 11009902 | 1/1999 |
| JP | 11033373 | 2/1999 |
| JP | 11244607 | 9/1999 |
| JP | 2000051606 | 2/2000 |
| JP | 2000084368 | 3/2000 |
| JP | 20000140505 | 5/2000 |
| JP | 20000262871 | 9/2000 |
| JP | 2000288366 | 10/2000 |
| JP | 2000350902 | 12/2000 |
| JP | 2003010604 | 1/2003 |
| JP | 2003062403 | 3/2003 |
| JP | 2003200024 | 7/2003 |
| JP | 2003245525 | 9/2003 |
| WO | WO 94/16800 | 8/1994 |
| WO | WO 97/02190 | 1/1997 |
| WO | WO 99/39811 | 8/1999 |
| WO | WO 00/44479 | 8/2000 |
| WO | WO 00/44482 | 8/2000 |
| WO | WO 03/029744 | 4/2003 |
| WO | WO 03/036747 | 5/2003 |
| WO | WO 03/080228 | 10/2003 |
| WO | WO 03/086573 | 10/2003 |
| WO | WO 2004/007060 | 1/2004 |
| WO | WO 2004/041397 | 5/2004 |

OTHER PUBLICATIONS

U.S. Appl. No. 11/334,590, entitled "Fuel Deoxygenation System With Non-Metallic Fuel Plate Assembly", filed Jan. 18, 2006.

U.S. Appl. No. 11/334,587, entitled "Fuel Deoxygenation With Non-Planar Fuel Channel and Oxygen Permeable Membran", filed Jan. 18, 2006.

U.S. Appl. No. 11/049,175, entitled "Fuel Deoxygenation System With Textured Oxygen Permeable Membrane," filed Feb. 2, 2005.

U.S. Appl. No. 11/265,845, entitled "Fuel Deoxygenation System With Multi-Layer Oxygen Permeable Membrane," filed Nov. 3, 2005.

Richard W. Baker, "Membrane Technology and Applications," 2nd Edition, John Wiley & Sons, Ltd., pp. 96-103.

* cited by examiner

FUEL DEOXYGENATION SYSTEM WITH NON-PLANAR PLATE MEMBERS

BACKGROUND OF THE INVENTION

The present invention relates to stabilizing fuel by deoxygenation, and more particularly to a fuel plate fuel stabilization unit.

Fuel is often utilized in aircraft as a coolant for various aircraft systems. The presence of dissolved oxygen in hydrocarbon jet fuels may be objectionable because the oxygen supports oxidation reactions that yield undesirable by-products. Dissolution of air in jet fuel results in an approximately 70 ppm oxygen concentration. When aerated fuel is heated between 350° F. and 850° F. the oxygen initiates free radical reactions of the fuel resulting in deposits commonly referred to as "coke" or "coking." Coke may be detrimental to the fuel lines and may inhibit combustion. The formation of such deposits may impair the normal functioning of a fuel system, either with respect to an intended heat exchange function or the efficient injection of fuel.

Various conventional fuel deoxygenation techniques are currently utilized to deoxygenate fuel. Typically, lowering the oxygen concentration to 2 ppm is sufficient to overcome the coking problem.

One conventional Fuel Stabilization Unit (FSU) utilized in aircraft removes oxygen from jet fuel by producing an oxygen pressure gradient across a membrane permeable to oxygen. The FSU includes a plurality of fuel plates sandwiched between permeable membranes and porous substrate plates disposed within a housing. Each fuel plate defines a portion of the fuel passage and the porous plate backed permeable membranes define the remaining portions of the fuel passages. The permeable membrane includes Teflon or other type of amorphous glassy polymer coating in contact with fuel within the fuel passages for preventing the bulk of liquid fuel from migrating through the permeable membrane and the porous plate.

The use of a plurality of similarly configured flat plates increases manufacturing efficiency and reduces overall cost. Further, the size and weight of the FSU is substantially reduced while increasing the capacity for removing dissolved oxygen from fuel. Moreover, the planar design is easily scalable compared to previous tubular designs.

Disadvantageously, the planar fuel plates are relatively difficult and expensive to manufacture. Furthermore, the permeable membrane is relatively thin (~2-5 microns) and may lack mechanical integrity. Contact between the fuel plate and the permeable membrane may result in damage to the permeable membrane. A damaged permeable membrane may permit fuel to seep through the membrane and accumulating in the backing which may result in resistance to deoxygenation.

Accordingly, it is desirable to provide for the deoxygenation of hydrocarbon fuel in a size and weight efficient system that increases fuel turbulence and deoxygenation.

SUMMARY OF THE INVENTION

The fuel system for an energy conversion device according to the present invention includes a deoxygenator system with a oxygen permeable membranes. A sweep gas and/or vacuum maintains an oxygen concentration differential across the oxygen permeable membranes to deoxygenate the fuel. The deoxygenator system includes a multiple of fuel plates, oxygen permeable membranes, porous substrate plates, and vacuum frame plates which define a wave pattern configuration. The wave configuration enhances deoxygenation by increasing the efficiency and integrality due to a higher surface volume ratio, an increase of flow turbulence, and minimal sharp edges which may otherwise damage the oxygen permeable membranes.

The present invention therefore provides for the deoxygenation of hydrocarbon fuel in a size and weight efficient system that increases fuel turbulence and deoxygenation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
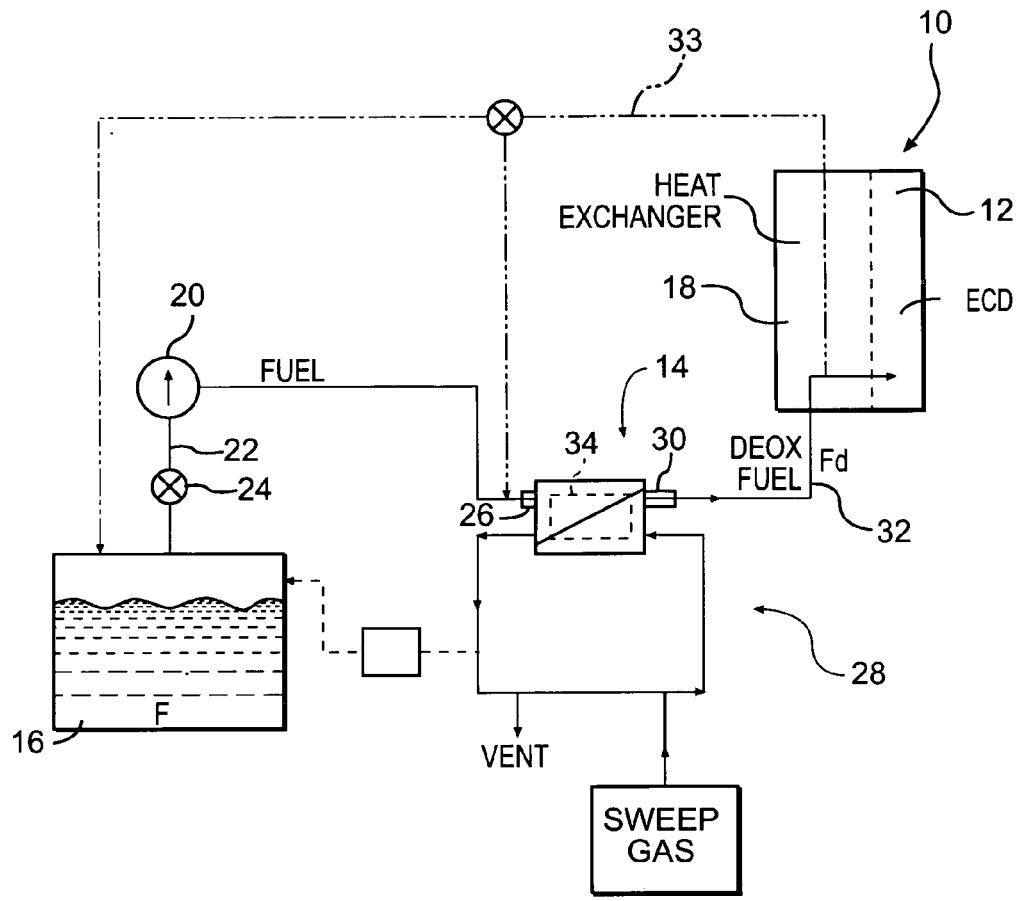
FIG. 1 is a general schematic block diagram of an energy conversion device (ECD) and an associated fuel system employing a fuel deoxygenator in accordance with the present invention.

FIG. 1 illustrates a general schematic view of a fuel system 10 for an energy conversion device (ECD) 12. A deoxygenator system 14 receives liquid fuel F from a reservoir 16 such as a fuel tank. The fuel F is typically a hydrocarbon such as jet fuel. The ECD 12 may exist in a variety of forms in which the fuel, at some point prior to eventual use for processing, for combustion or for some form of energy release, acquires sufficient heat to support autoxidation reactions and coking if dissolved oxygen is present to any significant extent in the fuel.

One form of the ECD 12 is a gas turbine engine, and particularly such engines in high performance aircraft. Typically, the fuel also serves as a coolant for one or more subsystems in the aircraft and becomes heated as it is delivered to fuel injectors immediately prior to combustion.

A heat exchange section 18 represents a system through which the fuel passes in a heat exchange relationship. It should be understood that the heat exchange section 18 may be directly associated with the ECD 12 and/or distributed elsewhere in the larger system 10. The heat exchange system 18 may alternatively or additionally include a multiple of heat exchanges distributed throughout the system.

As generally understood, fuel F stored in the reservoir 16 normally contains dissolved oxygen, possibly at a saturation level of 70 ppm. A fuel pump 20 draws the fuel F from the reservoir 16. The fuel pump 20 communicates with the reservoir 16 via a fuel reservoir conduit 22 and a valve 24 to a fuel inlet 26 of the deoxygenator system 14. The pressure applied by the fuel pump 20 assists in circulating the fuel F through the deoxygenator system 14 and other portions of the fuel system 10. As the fuel F passes through the deoxygenator system 14, oxygen is selectively removed into a sweep gas system 28.

The deoxygenated fuel Fd flows from a fuel outlet 30 of the deoxygenation system 14 via a deoxygenated fuel conduit 32, to the heat exchange system 18 and to the ECD 12 such as the fuel injectors of a gas turbine engine. A portion of the deoxygenated fuel may be recirculated, as represented by recirculation conduit 33 to either the deoxygenation system 14 and/or the reservoir 16. It should be understood that although a particular component arrangement is disclosed in the illustrated embodiment, other arrangements will benefit from the instant invention.

Figure 2:
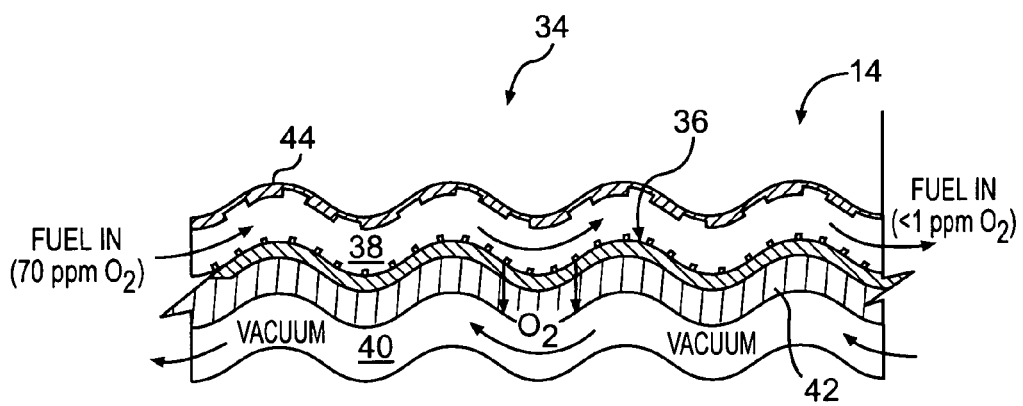
FIG. 2 is a schematic sectional view of a portion of the deoxygenator system illustrating a single fuel plate and a single oxygen permeable membrane.

Referring to FIG. 2, the deoxygenator system 14 preferably includes a multiple of gas/fuel micro-channel assemblies 34. The assemblies 34 include an oxygen permeable membrane 36 between a fuel channel 38 and an oxygen receiving channel such as a sweep gas channel 40. The sweep gas channel 40 preferably contains nitrogen and/or another inert gas. It should be understood that the channels may be of various shapes and arrangements to provide a pressure differential, which maintains an oxygen concentration differential across the membrane to deoxygenate the fuel. The fuel and the sweep gas preferably flow in opposite directions.

The oxygen permeable membrane 36 preferably includes porous membranes, which allow dissolved oxygen (and other gases) to diffuse through angstrom-size holes but exclude the larger fuel molecules, and permeable membranes which use a solution-diffusion mechanism to dissolve the oxygen (and the other gases) and allow it (or them) to diffuse through the membrane, while excluding the fuel. The family of polytetraflouroethylene type compounds (PTFE), often identified under the trademark "Teflon" registered to E. I. DuPont de Nemours of Wilmington, Del., have proven to provide effective results for fuel deoxygenation. The PTFE material is believed to use a solution-diffusion mechanism, but may also operate via its porosity, depending on formulation and structure. A further example of a porous membrane material is a thin layer of 50 Angstrom porous alumina ceramic, or zeolite. A further example of a permeable membrane is a thin layer of silicone rubber.

In operation, fuel flowing through the fuel channel 38 is in contact with the oxygen permeable membrane 36. Vacuum creates an oxygen partial pressure differential between the inner walls of the fuel channel 38 and the oxygen permeable membrane 36 which causes diffusion of oxygen dissolved within the fuel to migrate through a porous substrate 42 which supports the oxygen permeable membrane 36 and out of the deoxygenator system 14 through the sweep gas channel 40 separate from the fuel channel 38. In the micro channel, fully filled with the fuel stream, the concentration of the flammable volatiles is minimized and oxygen is removed through the oxygen permeable membrane 36 (by pressure difference across the oxygen permeable membrane 36) after bubble discharge on the membrane wall. For further understanding of other aspects of one membrane based fuel deoxygenator system and associated components thereof, attention is directed to U.S. Pat. No. 6,315,815 and U.S. patent application Ser. No. 10/407,004 entitled PLANAR MEMBRANE DEOXYGENATOR which are assigned to the assignee of the instant invention and which are hereby incorporated herein in their entirety.

Figure 3:
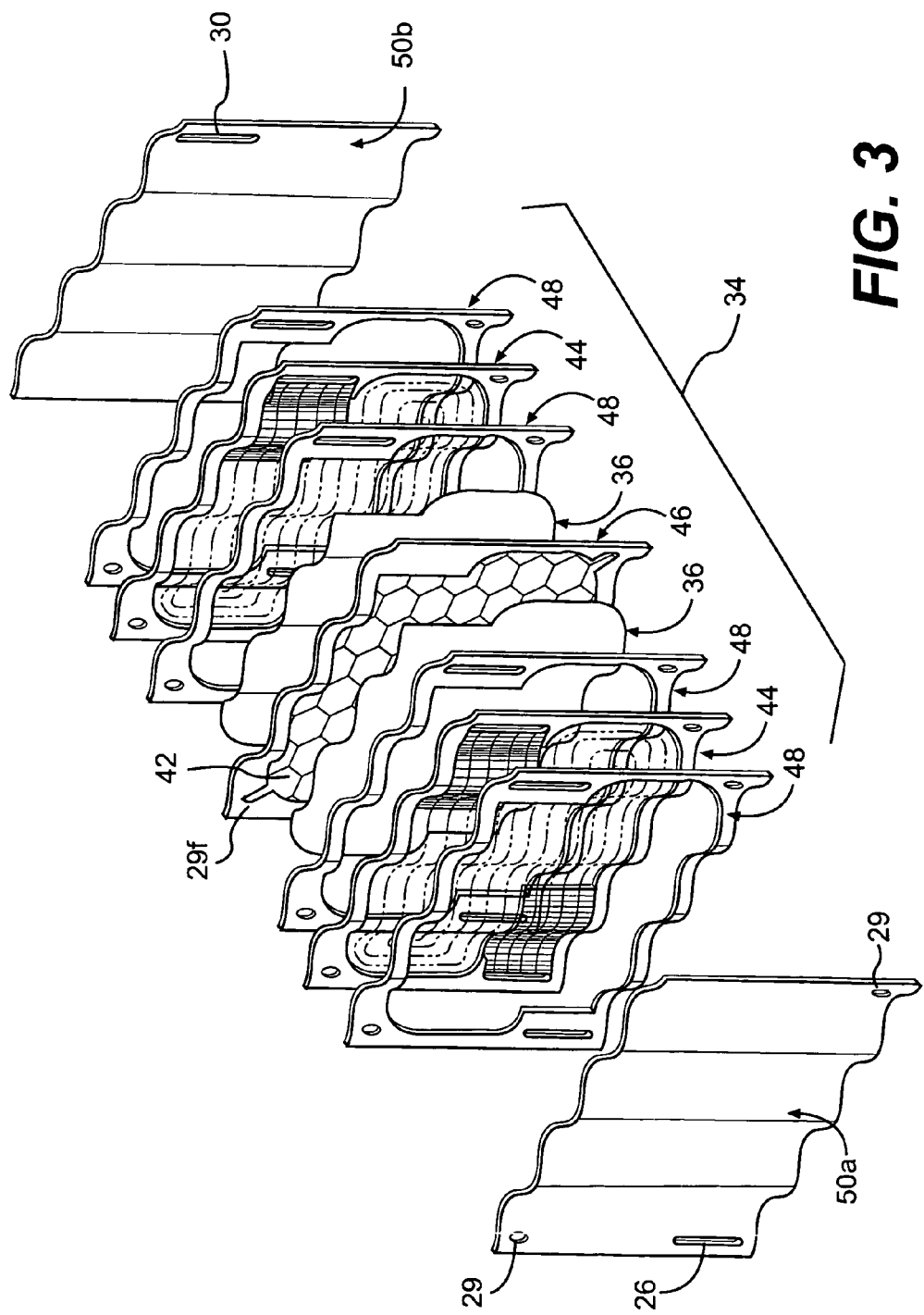
FIG. 3 is an exploded view of the deoxygenator system illustrating a multiple of fuel plates and oxygen permeable membranes as well as supporting plates therefor.

Referring to FIG. 3, the one set of plates, which form a micro-channel assembly 34 of the deoxygenator system 14, includes a multiple of fuel plates 44 sandwiched adjacent to oxygen permeable membranes 36 which are supported by the porous substrate 42. It should be understood that the porous substrate, although illustrated as a honeycomb pattern, may take various forms. The porous substrate 42 is a supported within a substrate frame plate 46. The oxygen permeable membrane 36 is supported by the porous substrate 42 to form a portion of the fuel channels 38 (FIG. 2). On each side of the oxygen permeable membrane 36 and the fuel plate 44 is a gasket 48. The gasket 48 prevents fuel from leaking across the predefined fuel passage defined by the fuel plate 44. The deoxygenation system 14, irrespective of the number of micro-channel assemblies 34, will be sealed by an outer housing plate 50a, 50b, which respectively include the inlet 26 and vacuum port 29, and the outlet 30. Although illustrated as rectilinear in the illustrated embodiment, one of ordinary skill in the art will recognize that alternative shapes, sizes, or configurations are suitable and within the scope of the invention.

The deoxygenator system 14 includes the fuel inlet 26, the fuel outlet 30 and a vacuum port 29. The vacuum port 29 is in communication with the vacuum source. Fuel flows from the fuel pump 20 to the inlet 26, through the outlet 30 to the ECD 12 (FIG. 1.)

The sweep gas channels 40 are formed by the plurality of fuel plates 44. Each fuel plate 44 and associated oxygen permeable membranes 36 define a portion of the fuel channel 38 between the inlet 26 and outlet 28. The vacuum port 29 is in communication with a vacuum port 29f through the substrate frame plate 46 and the porous substrate 42. Vacuum creates a partial pressure gradient within each of the porous substrates 42 to extract dissolved oxygen from the fuel channel 38 through the oxygen permeable membrane 36. The oxygen is expelled through the vacuum port 29. The gasket 48 prevents leakage of fuel between the fuel plates and provides a vacuum seal such that vacuum is pulled through the porous substrate 42.

The specific quantity of fuel plates 44, oxygen permeable membranes 36 and porous substrate frame plates 46 are determined by application-specific requirements, such as fuel type, fuel temperature, and mass flow demand from the engine. Further, different fuels containing differing amounts of dissolved oxygen may require differing amounts of deoxygenation to remove a desired amount of dissolved oxygen.

Figure 4:
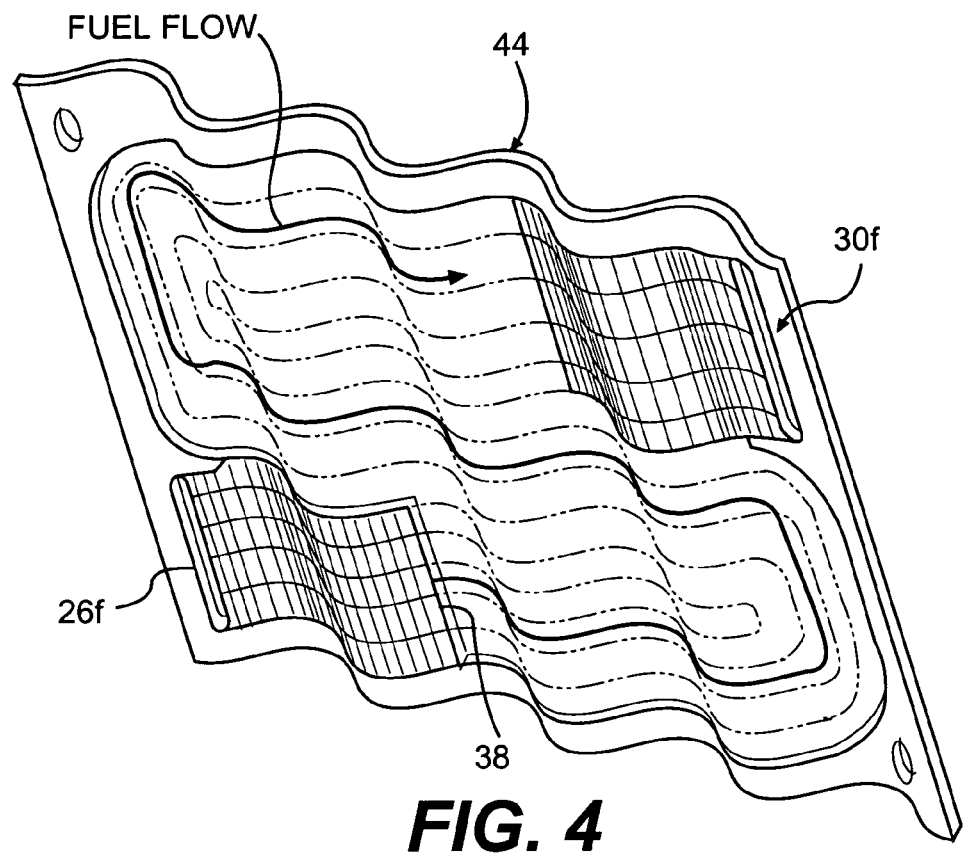
FIG. 4 is a general perspective view of a single non-planar fuel plate for use with the present invention.

The fuel plate 44 (FIG. 4) defines a portion of the sweep gas channels 40 (FIG. 42) between the inlet 26 and outlet 28. Each fuel plate 44 only defines two sides of each fuel channel 38 and the oxygen permeable membrane 36 defines the remaining side of each fuel passage 30. The configuration of the fuel channel 38 is preferably defined to assure that fuel is in maximum contact with the oxygen permeable membranes 36. Each fuel plate 44 includes an inlet 26f and an outlet 30f (FIG. 4). The fuel channels 38 are formed to maximize fuel exposure to the oxygen permeable membrane 36. This may be accomplished by providing mixing and/or optimal flow patterns for the fuel. The fuel channels 38 are formed to maximize the amount of area of the fuel in contact with the permeable membrane in order to maximize the amount of dissolved oxygen removed from the fuel. The fuel channels 38 are preferably small enough that fuel is in contact with the oxygen permeable membrane 36 and also must be large enough so as to not restrict fuel flow.

Preferably, the fuel plates 44, the oxygen permeable membranes 36, the porous substrate 42, the substrate frame plate 46, and the gasket 48 are non-planer and most preferably define a wave pattern. It should be understood that other non-planar shapes will also be usable with the present invention. The wave configuration enhances deoxygenation by increasing the efficiency and integrality due to higher surface volume ratio, increase of flow turbulence, and minimal sharp edges which may otherwise damage the oxygen permeable membranes 36 compared to sharp edge configurations. It should be understood that the oxygen permeable membranes 36 and the gaskets 48 are relatively resilient flexible members which may not initially be of the wave shape but when sandwiched between the plates 44, 46, 50a, 50b conform thereto to provide the non-planar shape.

Figure 5:
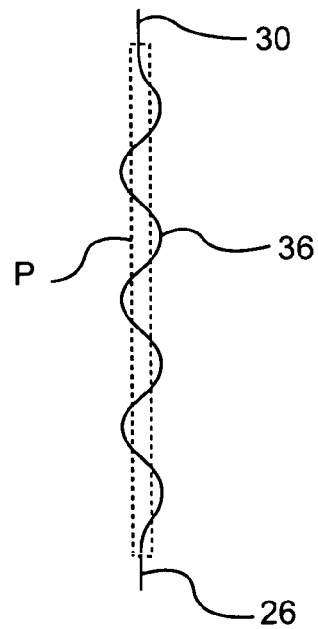
FIG. 5 is a schematic view of an oxygen permeable membrane illustrating the additional surface area provided by the serpentine arrangement thereof.

The plates 50a, 50b, 44, 46, oxygen permeable membranes 36, and gasket 48 are preferably non-planar relative to a plane P defined by the fuel flow between the inlet 26 and the outlet 30 (illustrated schematically in FIG. 5). That is, the fuel channel 38 is serpentine (FIG. 4) between the inlet 26 and the outlet 28 and is also non-planar (FIG. 5) therebetween. The non-planar construction of the deoxygenator system 14 enhancing contact between fuel flow and the oxygen permeable membrane 36 to increase mass transport of dissolved oxygen. Increased mass transport capacity permits a size reduction in the deoxygenator system 14 without a corresponding reduction in performance or a corresponding increase in performance for a deoxygenator system 14 of equal size.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fuel system comprising:
   a non-planar fuel plate;
   a non-planar substrate plate; and
   an oxygen permeable membrane mounted adjacent said non-planar substrate plate to define a non-planar fuel channel on one side of said oxygen permeable membrane and a non-planar oxygen receiving channel on an opposite side of said oxygen permeable membrane.

2. The fuel system as recited in claim 1, wherein said non-planar fuel plate defines a wave pattern.

3. The fuel system as recited in claim 1, wherein said non-planar substrate plate defines a wave pattern.

4. The fuel system as recited in claim 1, wherein said oxygen receiving channel communicates an inert gas therethrough.

5. The fuel system as recited in claim 1, wherein said oxygen receiving channel defines a vacuum therein.

6. The fuel system as recited in claim 1, wherein said non-planar substrate plate supports said oxygen permeable membrane such that said oxygen permeable membrane defines a wave pattern.

7. A method of minimizing dissolved oxygen from within a fuel system comprising:
   (1) mounting an oxygen permeable membrane adjacent a non-planar substrate plate to define a non-planar fuel channel on one side of the oxygen permeable membrane and a non-planar oxygen receiving channel on an opposite side of the oxygen permeable membrane; and
   (2) flowing a sweep gas through the non-planar oxygen receiving channel along the oxygen permeable membrane to draw at least a portion of the dissolved oxygen from the liquid fuel flow and through the oxygen permeable membrane.

8. The fuel system as recited in claim 1, wherein said non-planar fuel channel communicates a liquid fuel flow containing a dissolved oxygen along said oxygen permeable membrane.

9. The fuel system as recited in claim 1, wherein said non-planar fuel channel defines a wave pattern.

10. The fuel system as recited in claim 9, wherein said non-planar fuel channel communicates a liquid fuel flow containing a dissolved oxygen there along, a sweep gas flowing along an opposite side of said oxygen permeable membrane operable to draw at least a portion of the dissolved oxygen from the liquid fuel flow through said oxygen permeable membrane.

* * * * *